(12) United States Patent
Kawai et al.

(10) Patent No.: US 11,698,379 B2
(45) Date of Patent: Jul. 11, 2023

(54) COVER SLIP STICKING DEVICE

(71) Applicants: SAKURA SEIKI CO., LTD., Nagano (JP); SAKURA FINETEK JAPAN CO., LTD., Tokyo (JP)

(72) Inventors: Tomonori Kawai, Nagano (JP); Yamato Miyairi, Nagano (JP)

(73) Assignees: SAKURA SEIKI CO., LTD., Nagano (JP); SAKURA FINETEK JAPAN CO., LTD., Tokyo (JP)

( * ) Notice: Subject to any disclaimer, the term of this patent is extended or adjusted under 35 U.S.C. 154(b) by 1093 days.

(21) Appl. No.: 16/324,904

(22) PCT Filed: May 30, 2017

(86) PCT No.: PCT/JP2017/019997
§ 371 (c)(1),
(2) Date: Feb. 11, 2019

(87) PCT Pub. No.: WO2018/029943
PCT Pub. Date: Feb. 15, 2018

(65) Prior Publication Data
US 2021/0278428 A1    Sep. 9, 2021

(30) Foreign Application Priority Data

Aug. 12, 2016   (JP) .............................. JP2016-158785

(51) Int. Cl.
*G01N 35/00*     (2006.01)
*G01N 1/31*      (2006.01)
*G02B 21/34*     (2006.01)

(52) U.S. Cl.
CPC ....... *G01N 35/00732* (2013.01); *G01N 1/312* (2013.01); *G01N 35/00029* (2013.01);
(Continued)

(58) Field of Classification Search
CPC ............. G01N 35/00732; G01N 1/312; G01N 35/00029; G01N 35/00663;
(Continued)

(56) References Cited

U.S. PATENT DOCUMENTS

2004/0092024 A1* 5/2004 Reinhardt .............. G02B 21/34
                                                           422/63
2005/0186114 A1   8/2005 Reinhardt et al.
(Continued)

FOREIGN PATENT DOCUMENTS

EP    1717571 A2    2/2006
EP    1742032 A1    1/2007
(Continued)

OTHER PUBLICATIONS

Japan Patent Office, Japanese Patent Application No. 2020-071687, Notice of Reasons for Refusal, dated Mar. 23, 2021.
(Continued)

*Primary Examiner* — Matthew D Krcha
*Assistant Examiner* — Tingchen Shi
(74) *Attorney, Agent, or Firm* — William Thomas Babbitt, Esq.; Leech Tishman Fuscaldo & Lampl, Inc.

(57) ABSTRACT

It is an object to provide a cover slip sticking device capable of improving matching between types of clearing agents and cover slips. As a means for solving the problem, a cover slip sticking device includes a dipping bath (21) in which slide glasses (22) on which specimens are attached are housed to be dipped in a clearing agent, a holder (11) having a cover slip (10) and cover slip information (14), a mounting part (C) on which the holder is mounted, a sticking part (B) sticking the cover slip (10) taken out from the holder (11) on the slide glass (22), a reading unit (62) reading the cover slip information (14), a storage unit (65) storing a type of the clearing agent and matching information between types of
(Continued)

clearing agents and types of cover slips and a determination unit (66) comparing the cover slip information (14) read by the reading unit (62) and the type of the clearing agent stored in the storage unit (65) with the matching information to determine whether the types match with each other or not.

3 Claims, 13 Drawing Sheets

(52) U.S. Cl.
CPC . *G01N 35/00663* (2013.01); *G01N 35/00871* (2013.01); *G02B 21/34* (2013.01); *G01N 2035/00138* (2013.01); *G01N 2035/00752* (2013.01); *G01N 2035/00782* (2013.01); *G01N 2035/00801* (2013.01); *G01N 2035/00891* (2013.01)

(58) Field of Classification Search
CPC ....... G01N 35/00871; G01N 35/00722; G01N 1/31; G01N 35/00584; G01N 35/028; G02B 21/34
See application file for complete search history.

(56) References Cited

U.S. PATENT DOCUMENTS

| | | | |
|---|---|---|---|
| 2006/0153736 A1* | 7/2006 | Kalra | B01L 3/508 422/400 |
| 2007/0151672 A1* | 7/2007 | Takahashi | G01N 1/312 156/522 |
| 2010/0073766 A1* | 3/2010 | Angros | G02B 21/34 359/397 |
| 2012/0287261 A1 | 11/2012 | Neef et al. | |
| 2014/0178858 A1* | 6/2014 | Reinhardt | G01N 1/312 435/5 |

FOREIGN PATENT DOCUMENTS

| | | |
|---|---|---|
| JP | 2001-215415 A | 8/2001 |
| JP | 2001-337280 A | 12/2001 |
| JP | 2005523857 A | 8/2005 |
| JP | 2005-300323 A | 10/2005 |
| JP | 2006308575 A | 11/2006 |
| JP | 2012-242384 A | 12/2012 |
| WO | 2005098393 A1 | 10/2005 |
| WO | 2012036874 A2 | 3/2012 |

OTHER PUBLICATIONS

Sakura Seiki Co., Ltd, European Patent Office, "Extended European Search Report" issued in related European Patent Application No. 17839018.3 dated Jun. 7, 2019, 8 pages.

Sakura Seiki Co., Ltd., PCT Written Opinion of the Int'l Searching Authority, Application No. PCT/JP2017/019997, dated Jul. 4, 2017.

Sakura Seiki Co., Ltd, European Patent Office, "Supplementary European Search Report", EP Application No. 17839018 dated May 31, 2019.

Sakura Seiki Co. Ltd., European Patent Office, Extended Search Report, Application No. EP 20165719, dated Jul. 7, 2020.

Sakura Seiki Co., Ltd, European Patent Office, Annex to the Communication Issued in Related European Patent Application No. 17839018.3 dated Jul. 8, 2020.

Sakura Seiki Co., Ltd, European Patent Office, Communication From Examining Division, Issued in Related European Patent Application No. 17839018.3 dated Jul. 8, 2020.

Sakura Seiki Co. Ltd., PCT Int'l Preliminary Report on Patentability for Appl. No. PCT/JP2017/019997, dated Feb. 12, 2019.

Japan Patent Office, International Search Report and Written Opinion issued in parent International Patent Application No. PCT/JP2017/019997 dated Jul. 4, 2017, 7 pages.

European Patent Office, "Extended European Search Report" issued in related European Patent Application No. 17839018.3 dated Jun. 7, 2019, 8 pages.

* cited by examiner

COVER SLIP STICKING DEVICE

CROSS-REFERENCE TO RELATED APPLICATIONS

The present Application is a national stage of International Patent Application No. PCT/JP2017/019997, titled "Cover Slip Adhering Device," filed May 30, 2017, which claims priority from Japanese Patent Application No. 2016-158785, filed Aug. 12, 2016, the contents of which are incorporated in this disclosure by reference in their entirety.

TECHNICAL FIELD

The present invention relates to a cover slip sticking device that sticks a cover slip on a slide glass to which a specimen is attached.

BACKGROUND ART

In pathological examinations, after a specimen obtained by slicing a biological material is attached to a slide glass and dyeing processing is performed, a cover slip is stuck on the surface of the slide glass for protecting the specimen to be observed by a microscope.

In the specification, the cover slip is a concept including both a cover film and a cover glass.

A device for sticking a cover film on the surface of the slide glass is disclosed in PTL 1.

A cover film sticking device disclosed in PTL 1 includes a basket in which a plurality of slide glasses in a state where cover films are not stuck yet are housed and a take-out device for taking out the slide glasses from the basket.

The basket in which the slide glasses in the state where cover films are not stuck yet are housed is dipped in a clearing agent such as xylene for preventing drying of specimens.

A sealing agent or a solution for dissolving the sealing agent previously applied to the cover film is dropped to the slide glass taken out from the basket.

The cover film is drawn out of a winding body and cut by a cutter in a predetermined length. The cut cover film with the predetermined length is stuck on the slide glass to which the sealing agent is dropped by pressing.

Then, the slide glass on which the cover film is stuck is returned into the basket.

A device for sticking a cover glass on the surface of the slide glass is disclosed in PTL 2.

A cover glass sticking device disclosed in PTL 2 includes a basket in which a plurality of slide glasses in a state where cover glasses are not stuck yet are housed and a take-out device for taking out the slide glasses from the basket in the same manner as the cover film sticking device disclosed in PTL 1. The basket in which the slide glasses in the state where the cover glasses are not stuck yet are housed is dipped in a clearing agent such as xylene for preventing drying of the specimens.

The cover glasses are housed in a holder in a state where plural cover glasses are stacked. The cover glasses are taken out from the holder one by one by a suction pad provided in a pivot arm.

When the cover glass is stuck on the slide glass, the cover glass is inclined by turning the pivot arm so as to abut on the slide glass from one end side to be stuck in a state where air is expelled.

CITATION LIST

Patent Literature

PTL 1: JP-A-2005-300323
PTL 2: JP-A-2001-337280

SUMMARY OF INVENTION

Technical Problem

There are many cases where the sealing agent is previously applied to the cover film and the cover glass, and it is configured that the sealing agent is dissolved by the clearing agent to perform sealing at the time of sticking. However, when a combination of the used sealing agent and clearing agent is not suitable, there are problems that bubbles may be mixed at the time of sticking and the cover film or the cover glass may be peeled off after the sealing.

As described above, when a combination of the clearing agent and the cover film or the cover glass is not suitable, there is a danger that situations occur in which the specimen is dried and damaged or that bubbles are mixed and a microscopy range is narrowed to make pathological diagnosis difficult to reach. In particular, to dry and lose the specimen is a large problem, and further, when bubbles are mixed, a portion where observation is difficult to make is generated by being interrupted by bubbles, which causes a large problem of lack of data. If the sealing can be performed again in the above case, there is a problem that a loss of time occurs until the microscopy and work efficiency is reduced.

Then, when the problem of a mismatch in the combination between the clearing agent and a type of the cover film or a type of the cover glass occurs, it is difficult to specify a cause and difficult to obtain proper improvement.

The present invention has been made for solving the above problems, and an object thereof is to provide a cover slip sticking device capable of improving the matching between the clearing agent and the type of the cover slip.

Solution to Problem

A cover slip sticking device according to the present invention includes a dipping bath in which a clearing agent is contained and slide glasses on which specimens are attached are housed to be dipped in the clearing agent, a holder holding a cover slip as a cover film or a cover glass and having cover slip information including at least a type of the cover slip held therein, a mounting part on which the holder is mounted; a sticking part sticking the cover slip taken out from the holder mounted on the mounting part on the slide glass, a reading unit reading the cover slip information possessed by the holder, a storage unit storing a type of the clearing agent currently contained in the dipping bath and matching information between types of clearing agents and types of cover slips and a determination unit comparing the type of the cover slip in the cover slip information read by the reading unit and the type of the clearing agent currently contained in the dipping bath and stored in the storage unit with the matching information to determine whether the types match with each other or not.

When adopting the above structure, it is possible to stick a different cover slip in the case where the types do not match without using the cover slip mounted on the mounting part based on the determination result by the determination unit. Accordingly, a sealing error such as mixing of bubbles can be reduced.

The cover slip sticking device may further include a notification unit notifying an operator of a result determined by the determination unit.

According to the above structure, the operator can know the determination result concerning whether the type of the cover slip matches with the type of the used clearing agent.

The cover slip information may be recorded on a surface of the holder.

The record in this case indicates that characters, numerals, a bar code, a QR code (registered trademark) and the like are written on the holder surface by printing or the like.

A cover slip storage unit storing cover slip information may be provided in the holder.

According to the structure, much information can be stored in the holder as compared with the case where the cover slip information is written on the holder surface.

It is preferable that the cover slip storage unit is capable of rewriting stored data, and the cover slip sticking device may further include a reader/writer capable of reading the cover slip information and rewriting cover slip information inside the cover slip storage unit or writing new information.

According to the structure, information necessary after the use of the cover slip can be stored in the cover slip storage unit, and the information can be utilized when the cover slip in the same holder is used. That is, use history of the cover slip held in the holder can be stored in the holder as information, thereby ensuring the traceability.

The cover slip information may contain an initial value of a cover slip amount including a length or the number of cover slips held in the holder, and the cover slip sticking device may further include a usage volume calculation unit calculating a usage volume of the cover slip taken out from the holder and used, and a remaining amount calculation unit calculating a remaining amount of the cover slip held in the holder by subtracting the usage volume measured by the usage volume calculation unit from the initial value of the cover slip amount in cover slip information read out by the reading unit, in which the writing unit may write the remaining amount of the cover slip held in the holder which is calculated by the remaining amount calculation unit in the cover slip storage unit.

According to the above structure, when the holder is taken out from the cover slip sticking device after finishing the work and is used at the next time, an accurate remaining amount can be known. Therefore, the replacement time of the cover slip can be anticipated and it is not necessary to constantly monitor the device. Furthermore, in the case where the cover slip is the cover film, it is not necessary to route the cover film for an assured length for sealing.

The cover slip information may contain an expiration date of the cover slip, and the cover slip sticking device further includes a calendar function and an expiration date detection unit comparing the expiration date in cover slip information read by the reading unit with a current date based on the calendar function to detect that the expiration date has passed since the current date.

According to the structure, the use of the expired cover slip may be inhibited, therefore, the sealing error and the like can be reduced.

The expiration date detection unit may notify that the expiration date has passed by the notification unit when detecting that the expiration date has passed.

According to the above, the operator can know whether the cover slip has expired or not and the sealing error can be reduced.

Advantageous Effects of Invention

According to the cover slip sticking device of the present invention, the sealing error such as mixing of bubbles can be reduced.

DESCRIPTION OF EMBODIMENTS

First Embodiment

Hereinafter, a sticking device adopting a cover film as a cover slip will be explained.

First, the cover film will be explained.

Figure 1:
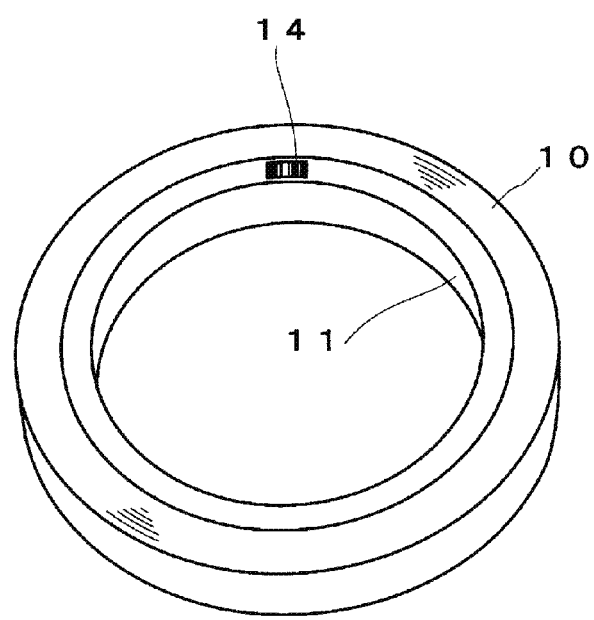
FIG. 1 is a perspective view showing an external structure of a holder for a cover film.

A cover film 10 shown in FIG. 1 is a resin film and is attached into the sticking device in a state of being wound around a ring-shaped holder 11. A length of the cover film 10 is approximately 60 m, which is drawn out from the wound state and is cut in a predetermined length to be used.

A cover slip information 14 is written on the surface of the holder 11. As a writing method, a bar code or a QR code may be adopted.

The cover slip information 14 includes at least a type of the cover film. It is preferable that the cover slip information also includes a length of the cover film, an expiration date and so on.

Note that the type of the cover film may be a part number of the cover film as well as includes contents indicating whether a sealing agent is applied to the cover film or not and which type the sealing agent is if it is applied. In a case where the cover slip information includes only the part number of the cover film, it is necessary that the cover film sticking device's side store the part number of the cover film, whether the sealing agent is applied to the cover film or not and which type the sealing agent is if it is applied by being associated with each other.

Next, the cover film sticking device will be explained with reference to FIG. 2.

A cover film sticking device 30 includes a dipping bath 32 in which the clearing agent is contained. A plurality of slide glasses 22 to which sliced specimens are attached are housed in a basket 21. The basket 21 has a shape in which the plural slide glasses 22 to which sliced specimens are attached are inserted and housed so as to be perpendicular to a bottom surface part. The slide glasses 22 are housed inside the dipping bath 32 in a state of being housed in the basket 21 to be dipped in the clearing agent.

The cover film sticking device 30 includes a take-out arm 34 for taking out the basket 21 from the dipping bath 32. The take-out arm 34 is provided with a holding part 36 for holding the basket 21 at a tip end, turning on a vertical plane around a pivot shaft 35 directed to a horizontal direction and taking out the basket 21 from the dipping bath 32.

The take-out arm 34 turns at 90 degrees on the vertical plane and turns to a position where the slide glasses 22 in the basket 21 taken out from the dipping bath 32 are in a horizontal position.

The basket 21 turns to the position where the slide glasses 22 are in the horizontal position is placed on a lifting base 37 lifting and lowering in a vertical direction. The lifting base 37 lifts the basket 21 to a standby position (symbol A in FIG. 2).

In the standby position, a push-ejector 38 pushing out the slide glasses 22 from the basket 21 one by one is provided.

The push-ejector 38 pushes out the slide glass 22 from the basket 21 and moves the slide glass 22 to a prescribed position B on a horizontal table 40.

The cover film 10 is stuck on the slide glass 22 in the prescribed position B.

The cover film 10 is wound around the holder 11 as described above and is mounted on a mounting part C on which the holder 11 is mounted.

At the time of mounting the holder 11 to the mounting part C, it is necessary to mount the holder 11 so that the cover slip information 14 written on the surface of the holder 11 faces a direction and is positioned in a place where the information can be read by a later-described reading unit.

The cover film 10 is drawn out from an upper part of the holder 11 in the horizontal direction and goes downward through a roller 44. The cover film 10 is positioned at an angle in which the cover film 10 approaches to the slide glass 22 arranged at the prescribed position B obliquely from above further through a pair of feeding rollers 46.

In a position closer to the prescribed position B than the feeding rollers 46, a cutter 48 for cutting the cover film 10 in a predetermined length and a pair of cover rollers 50 for feeding the cover film 10 cut in the predetermined length to an upper part of the slide glass 22.

Also in the prescribed position B, a dispensing nozzle 52 for dropping the sealing agent is provided. The dispensing nozzle 52 is connected to a not-shown pump and a pipe, sucking up the sealing agent from a solvent bottle 55 through the not-shown pump and the pipe. A tip end of the dispensing nozzle 52 is arranged above the specimen on the slide glass 22 arranged in the prescribed position B, and the sealing agent can be dropped to an upper face of the specimen.

The cover film 10 cut in the predetermined length is stuck on the slide glass 22 by a sticking roller 54 as a sticking part.

The slide glass 22 to which the cover film 10 has been stuck is moved in the horizontal direction so as to be housed in an original position in the basket 21 by a return ejector 56.

When sticking of the cover film 10 to a piece of slide glass 22 is completed, the lifting base 37 lifts the basket 21 for a thickness of a piece of slide glass 22. Then, a next slide glass 22 to which the cover film 10 is not stuck yet is pushed out from the basket 21 to the prescribed position B, and the cover film 10 is stuck.

When sticking of the cover film 10 on all the slide glasses 22 in the basket 21 is completed, the lifting base 37 moves upward and houses the basket 21 in a housing part 58 where the basket 21 after sticking the cover film is housed.

The sealing agent and so on overflowed from the slide glass 22 fall into a waste liquid tray 59 arranged below the prescribed position B and are gathered there to be stored in a waste liquid bottle 60 arranged below the waste liquid tray 59.

Figure 3:
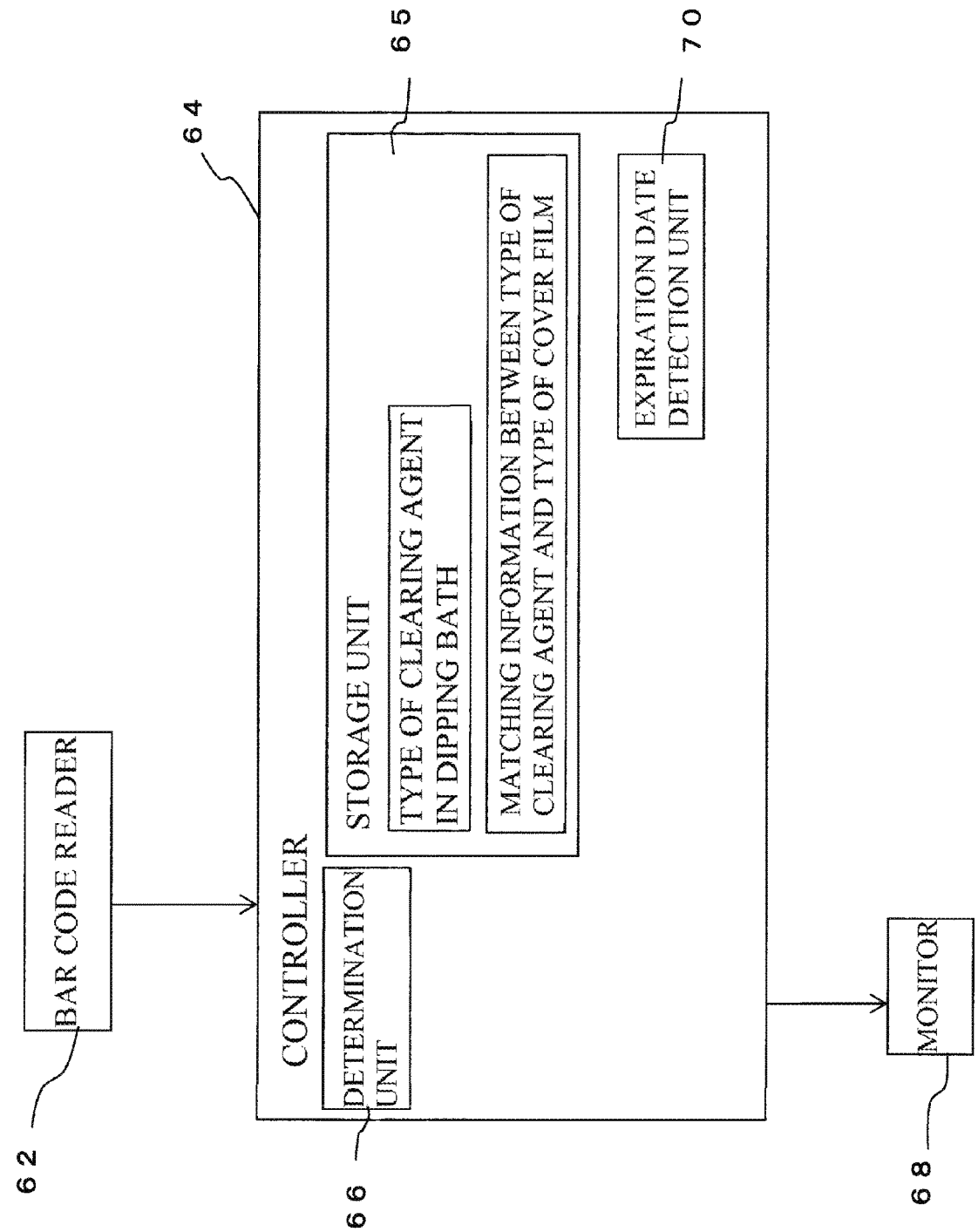
FIG. 3 is a block diagram showing an embodiment in which cover slip information corresponds to a bar code and a notification unit corresponds to a monitor.

Next, reading of cover slip information and usage of the cover slip information will be explained with reference to FIG. 3.

A reading unit 62 that reads out cover slip information written in the surface of the holder 11 is provided in the vicinity of the mounting part C of the cover film sticking device 30.

As the case where the cover slip information is written by the bar code as shown in FIG. 1 has been explained in the present embodiment, an example where a bar code reader is used as the reading unit 62 will be explained.

The reading unit 62 may adopt a CCD camera or the like instead of the bar code reader. A QR code may be used as cover slip information. In that case, the CCD camera is used as the reading unit 62 and read data is analyzed by an application for identifying the QR code.

The operation of reading the cover slip information by the bar code reader 62 is executed based on an instruction from a controller 64.

The controller 64 controls the entire operation of the cover film sticking device 30, including a CPU, a memory and so on. An operation control program is stored in the memory in advance, and the operation of the cover film sticking device 30 is executed by executing the operation control program.

The operation of the cover film sticking device 30 includes driving of the take-out arm 34 that takes out the basket 21 from the dipping bath 32, driving of the lifting base 37 that lifts the taken basket 21, driving of the push-ejector 38 and the return-ejector 56, driving of the feeding roller 46 that introduces the cover film 10 to the prescribed position B, driving of the cutter 48 that cuts the cover film 10 in the predetermined length, dispensing operation by the dispensing nozzle 52, driving of the sticking roller 54 and so on as described above.

The controller 64 is provided with a storage unit 65 storing a type of the clearing agent currently contained in the dipping bath and matching information between the types of the clearing agents and types of the cover films.

It is necessary that an operator store the information in the storage unit 65 in advance.

The types of the cover films include whether sealing agents are previously applied to respective cover films or not and types of the sealing agents when the sealing agents are applied.

Moreover, the matching information stored in the storage unit 65 is information concerning whether the types of the clearing agents to be contained in the dipping bath 32 match with types of plural sealing agents or not, respectively.

The controller 64 extracts information concerning whether the sealing agent is previously applied to the cover film or not and the type of the sealing agent if it is applied from the cover slip information read out by the bar code reader 62, and a determination unit 66 as a function of the controller 64 determines that the sealing agent is not applied to the cover film, determines that the sealing agent applied to the cover film matches with the clearing agent currently contained in the dipping bath or determines that the sealing agent applied to the cover film does not match with the clearing agent currently contained in the dipping bath.

When it is determined that the sealing agent is not applied to the cover film and when it is determined that the sealing agent applied to the cover film matches with the clearing agent currently contained in the dipping bath by the determination unit 66, the controller 64 does not particularly take an action. However, when it is determined that the sealing agent applied to the cover film does not match with the clearing agent currently contained in the dipping bath, the controller 64 notifies the operator of the status through a notification unit 68.

A monitor 68 such as liquid crystal can be adopted as the notification unit 68. The controller 64 allows the monitor 68 to display that "the sealing agent applied to the cover film does not match with the clearing agent" to prompt the operator to replace the cover film.

The controller 64 may display the status on the monitor 68 also when the sealing agent is not applied to the cover film and when the sealing agent applied to the cover film matches with the clearing agent currently contained in the dipping bath.

The result determined by the determination unit 66 may be stored in the storage unit 65, not being notified by the notification unit 68.

The cover slip information may also include the expiration date of the cover film.

In this case, a calendar function is provided in advance in the controller 64 (not shown). When the expiration date is included in the cover slip information read out by the bar code reader 62, an expiration date detection unit 70 as a function of the controller 64 compares a current date with the expiration date. When the expiration date detection unit 70 detects that the cover film is within the expiration date for use, the controller 64 does not particularly take an action, and when the expiration date detection unit 70 detects that the expiration date has passed, the controller 64 allows the monitor 68 to display the status to prompt the operator to replace the cover film.

The cover slip information may further includes a lot number. The expiration date is not necessary in this case. Also in this case, it is necessary to previously provide the calendar function and data in which lot numbers are associated with expiration dates in the controller 64 (not shown).

The expiration date detection unit 70 of the controller 64 calculates the expiration date from the data stored in advance based on the lot number read out by the bar code reader 62 and compares the current date with the expiration date. When expiration date detection unit 70 detects that the cover film is within the expiration date, the controller 64 does not particularly take an action, and when the expiration date detection unit 70 detects that the expiration date has passed, the controller 64 allows the monitor 68 to display the status to prompt the operator to replace the cover film.

The cover slip information may include a manufacturing date of the cover film. The expiration date is not necessary in this case. Also in this case, it is necessary to previously provide the calendar function and data in which manufacturing dates are associated with expiration dates in the controller 64 (not shown).

The expiration date detection unit 70 of the controller 64 calculates the expiration date from the data stored in advance based on the manufacturing date read out by the bar code reader 62 and compares the current date with the expiration date. When expiration date detection unit 70 detects that the cover film is within the expiration date, the controller 64 does not particularly take an action, and when the expiration date detection unit 70 detects that the expiration date has passed, the controller 64 allows the monitor 68 to display the status to prompt the operator to replace the cover film.

The monitor 68 is not used only for notifying the matching between the sealing agent of the cover film and the clearing agent and/or for notifying the expiration date but also may be used also as a monitor for displaying normal sticking work.

Figure 4:
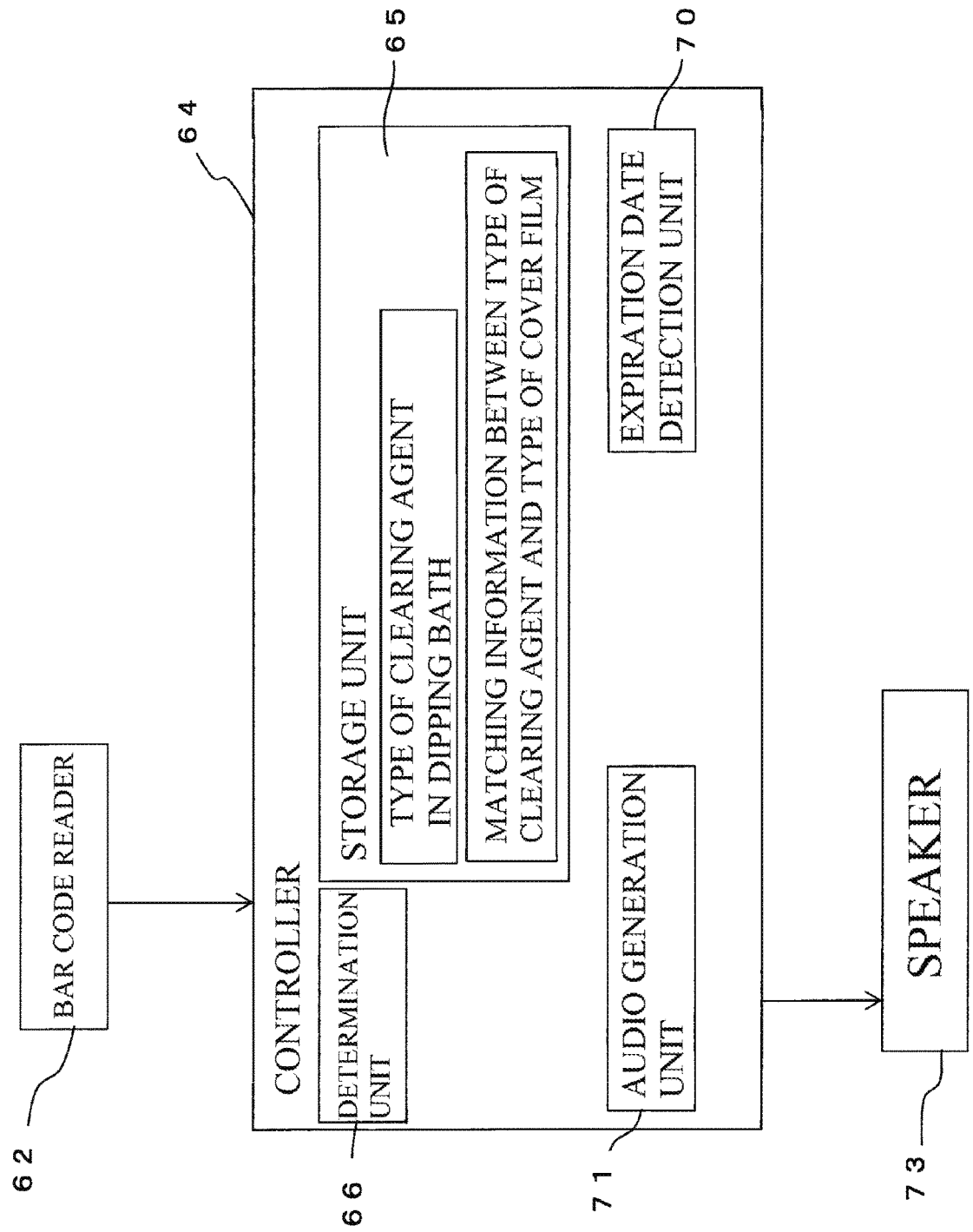
FIG. 4 is a block diagram showing an embodiment in which the cover slip information corresponds to the bar code and the notification unit corresponds to a speaker.

The notification unit is not limited to the monitor but may be configured by an audio generation unit 71 and a speaker 73 for outputting the contents indicating that "the sealing agent applied to the cover film does not match with the clearing agent", "the expiration date has passed" and so on by audio as shown in FIG. 4.

In the case of the configuration, it is necessary that the audio generation unit 71 stores audio data such as "the sealing agent applied to the cover film does not match with the clearing agent" and "the expiration date has passed" in advance.

Furthermore, the notification unit may notify the operator by using buzzer sound other than audio from the speaker 73 in the case where the sealing agent does not match with the clearing agent and/or the expiration data has passed.

Figure 5:
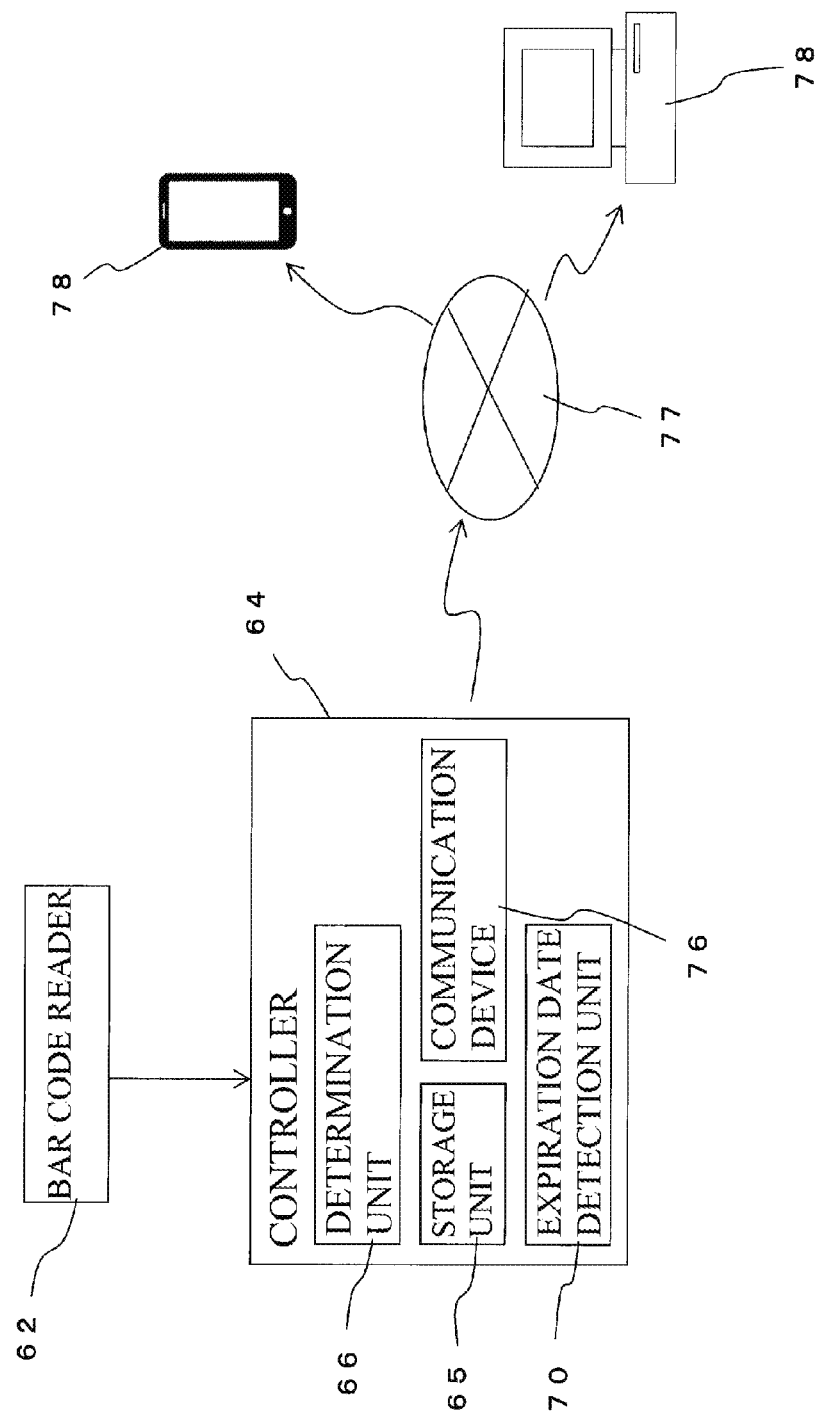
FIG. 5 is a block diagram showing the embodiment in which the cover slip information corresponds to the bar code and the notification unit corresponds to an external apparatus connected by a communication device.

As shown in FIG. 5, the notifying unit may also be a communication device 76 capable of performing data communication with an external apparatus. The communication device 76 is connected to a communication line 77 such as Internet so as to perform data communication and can notify an external apparatus 78 connected to the communication line 77. As the external apparatus 78, portable communication devices such as a smart phone or a normal personal computer can be cited.

For example, in the case where the sealing agent does not match with the clearing agent and/or that the expiration date has passed, the communication device 76 transmits the status that the sealing agent does not match with the clearing agent and/or that the expiration date has passed to the external apparatus 78. Accordingly, the above information can be notified to a person possessing the external apparatus 78.

It is preferable that the controller 64 allows the storage unit 65 to store results about whether the sealing agent matches with the clearing agent as a determination result by the determination unit 66 and/or whether the expiration date has passed or not as a determination result by the expiration date determination unit 70.

As these results are stored in the storage unit 65, it is possible to ensure traceability and to pursue a cause easily when any problem is found after sticking.

Respective examples in which the monitor 68, the speaker 73 and the external apparatus 78 are adopted as the notification unit have been explained in the above first embodi-

Second Embodiment

In a second embodiment, an example in which cover slip information is stored in a cover slip storage unit capable of rewriting data will be explained. The same symbols are given to the same components as those of the first embodiment and explanation thereof may be omitted.

Figure 6:
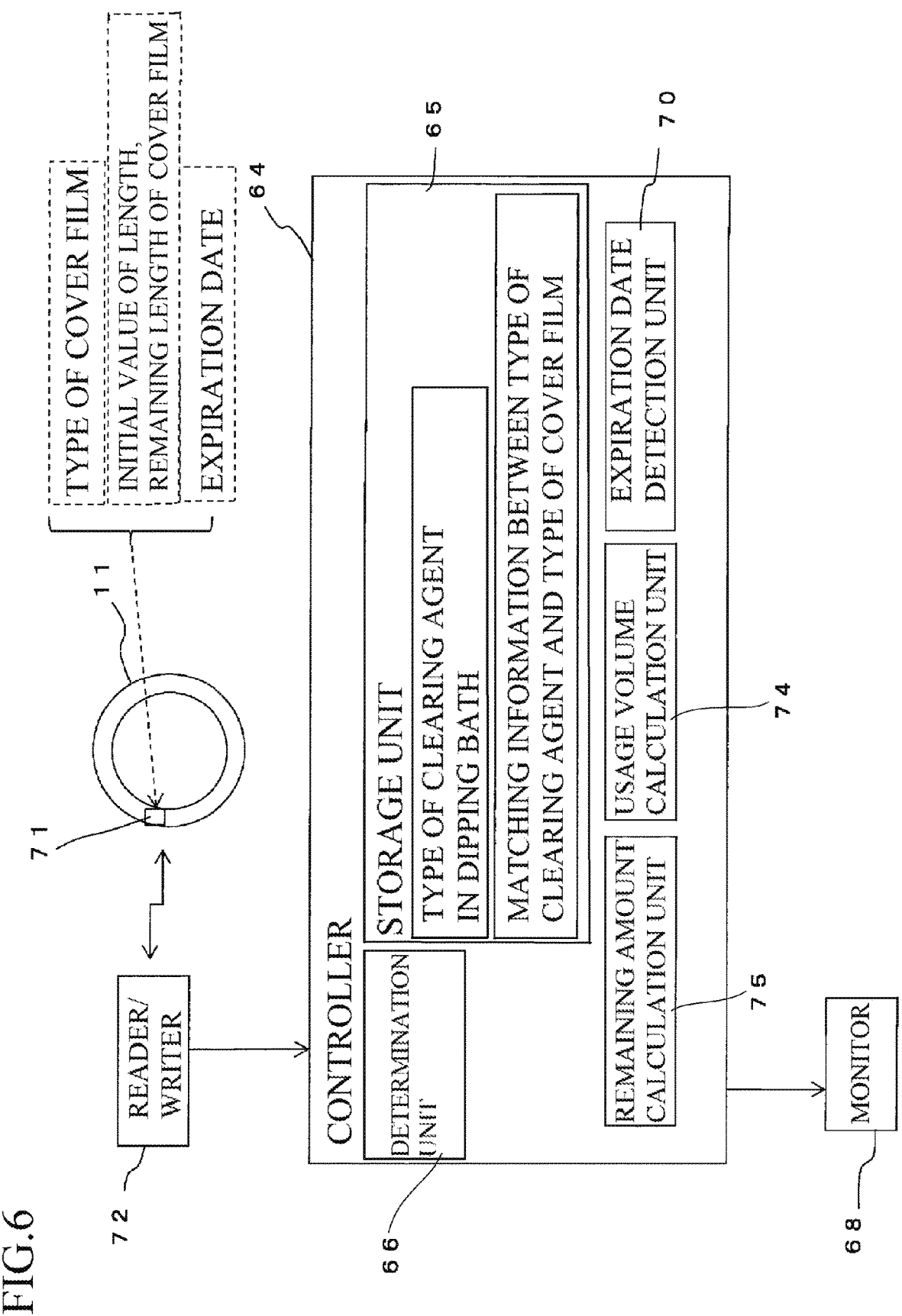
FIG. 6 is a block diagram showing an embodiment in a case where the cover slip information is stored in an RFID.

Hereinafter, an embodiment in which RFID 71 is adopted as the cover slip storage unit will be explained with reference to FIG. 6.

The RFID 71 is embedded in any position of the holder 11.

The cover film sticking device 30 is also provided with a reader/writer 72 capable of reading and writing data from and in the RFID 71.

As the cover slip information stored in the RFID 71, an initial value of the length of the cover film is stored in a case of a brand-new cover film and a remaining amount of the length of the cover film is stored in a case of a used cover film, in addition to the type and the expiration date of the cover slip.

It is also preferable that the lot number or the manufacturing date of the cover film is stored, not the expiration date, as the cover slip information in the same manner as the first embodiment.

The cover film sticking device 30 is provided with a usage volume calculation unit 74 calculating a usage volume (length) of the cover film. The usage volume calculation unit 74 is provided as a function of the controller 64. The usage volume calculation unit 74 can perform calculation by multiplying the number of cover films cut in the predetermined length by the cutter 48 and the predetermined length of a piece of the cover film.

The cover film sticking device 30 is also provided with a remaining amount calculation unit 75 calculating a remaining length of the cover film wound around the holder 11 based on the used length of the cover film.

The remaining amount calculation unit 75 is provided as a function of the controller 64. The remaining amount calculation unit 75 can calculate the remaining length of the cover film wound around the holder 11 by subtracting the used length calculated by the usage volume calculation unit 74 from the initial value of the length of the cover film.

The reader/writer 72 can write the remaining length of the cover film in the RFID 71 based on the remaining length of the cover film calculated by the remaining amount calculation unit 75.

As the initial value of the length of the cover film is stored in the RFID 71 if an unused holder 11 is used for the first time, the reader/writer 72 rewrites the initial value or stores a remaining length separately from the initial value.

In a case of using the holder 11 used last time, the remaining length is stored in the RFID 71, therefore, the reader/writer 72 rewrites the remaining length.

If the cover film is left attached to the inside of the cover film sticking device 30, the cover film may be plastically deformed at a position where the cover film is bent with a particularly large curvature in positions where the cover film is routed by a roller, a pulley or the like. When the cover film is plastically deformed, sealing performance may deteriorate and device control may be affected at the next use. Accordingly, the cover film wound around the holder 11 is removed from the cover film sticking device 30 after one-day operation of the cover film sticking device is finished, and is newly attached to the mounting part C of the cover film and used at the next time.

As the remaining amount of the cover film is stored in the RFID 71 at this time, the controller 64 reads the remaining amount of the cover film from the RFID 71 and displays the remaining amount on the monitor 68, thereby allowing the operator to know the timing when the cover film should be replaced after use.

Figure 7:
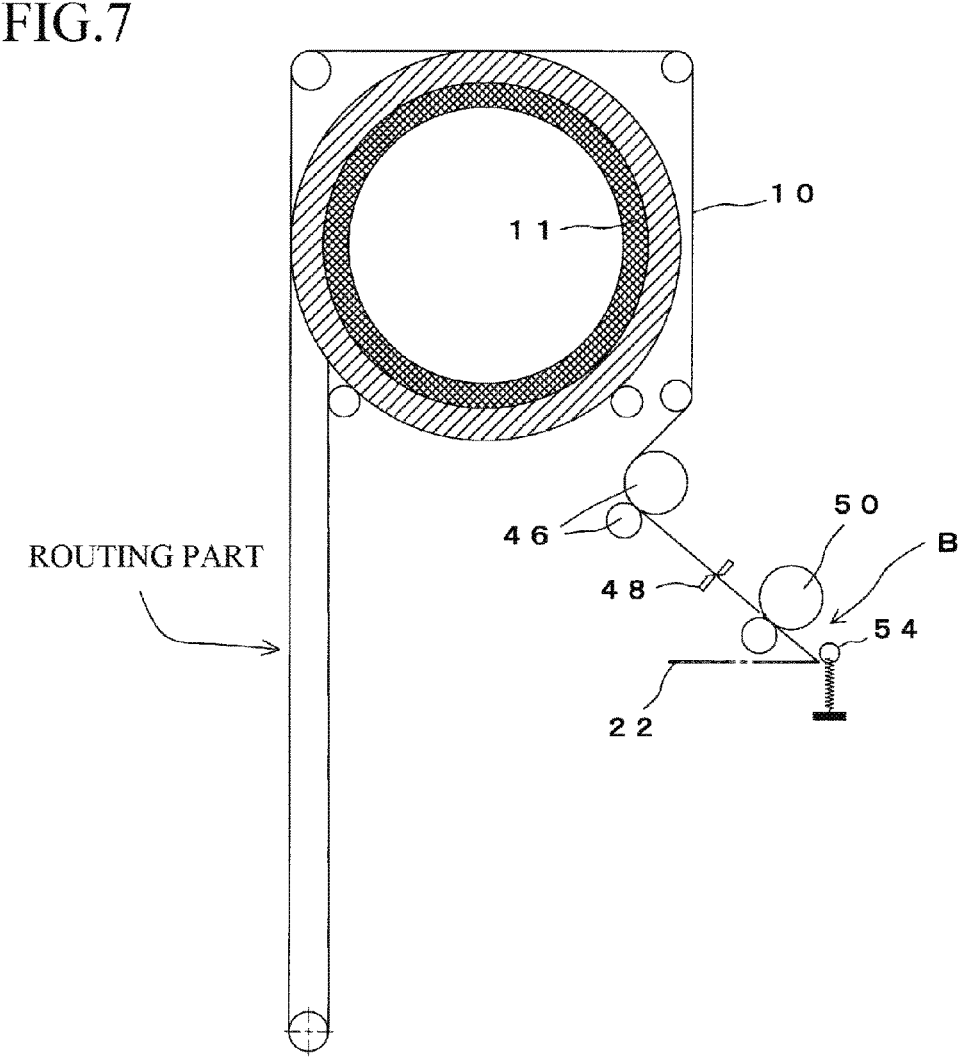
FIG. 7 is an explanatory view showing a sticking part of a related-art cover film.

FIG. 7 shows a peripheral structure of a related-art mounting part C of the cover film. The structure is approximately the same as the peripheral structure of the mounting part C shown in FIG. 2 other than a routing part in FIG. 7, and the same symbols are given to the same components and the explanation thereof is omitted.

In the related-art structure, the cover film is routed so as to ensure the cover film having a length enough to be stuck on all the maximum number of slide glasses 22 housed in the basket 21 from drawing of the cover film from the holder 11 until reaching the prescribed position B as the sticking position.

According to the above, even if a sensor (not shown) detects that the cover film drawn out from the holder 11 is finished, the cover film can be stuck on at least all the slide glasses housed in the basket 21 to which sticking work is currently performed.

Therefore, specimens on the slide glasses are not left in a state of being exposed in air for a long time, which can avoid damage of the specimens.

Figure 2:
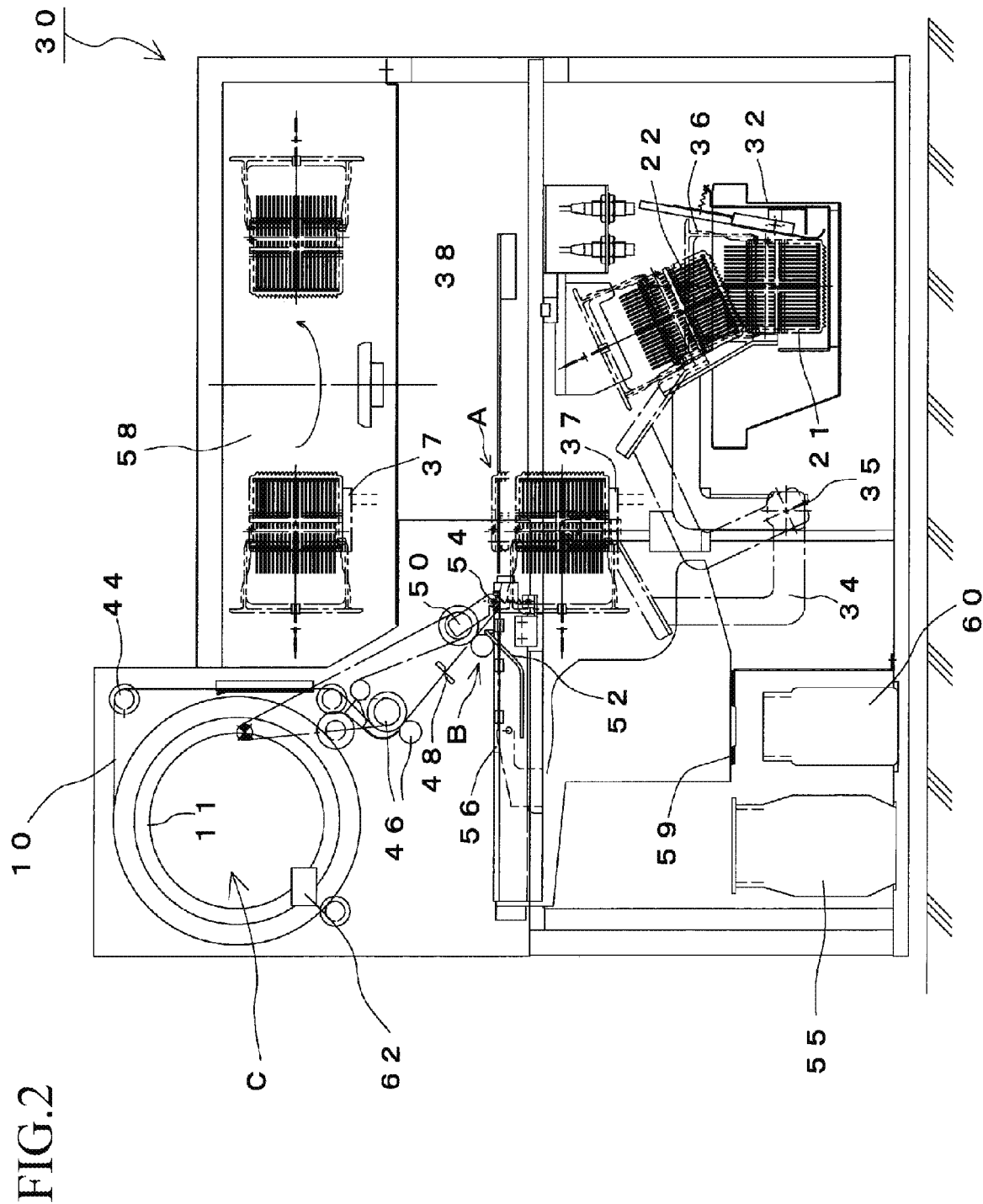
FIG. 2 is an explanatory view showing an internal structure of a cover film sticking device seen from the front.

In this point, as the remaining amount of the cover film can be accurately known in the present embodiment, the cover film drawn out from the holder can be introduced to the prescribed position B without being routed for the length of the maximum number of slide glasses housed in the basket as shown in FIG. 2, therefore, it is not necessary to ensure an extra space for routing, and it is possible to avoid adverse effects that fingerprints are attached and that the film is folded due to elongation of routing.

The controller 64 may collect use history of the cover film sticking device 30 and may store the collected use history in the RFID 71 of the holder 11 from the reader/writer 72.

According to the above, even when it is difficult to read out use history due to failure or the like of the cover film sticking device 30 itself, the use history can be read out from the holder 11.

The example in which the monitor 68 is adopted as the notification unit has been explained in the above second embodiment, however, the speaker 73 or the external apparatus 78 may be adopted as the notification unit and configurations in which these components are combined suitably may also be adopted.

The reader/writer 72 may be provided in the outside of the cover film sticking device 30 separately (not shown), not in the inside of the cover film sticking device 30. In this case, the cover slip information can be read and written from the outside of the cover film sticking device 30.

Third Embodiment

Hereinafter, a cover glass sticking device 90 adopting a cover glass as a cover slip will be explained.

First, the cover glass and a holder will be explained with reference to FIG. 8.

A cover glass 80 is formed in a predetermined length at the time of use in advance, which is different from the case of the cover film. A plurality of (normally, about 100 to 300 pieces) cover glasses 80 are housed in a stacked manner in a holder 82 and attached to the inside of the cover glass sticking device 90 with the holder 82.

The holder 82 shown here includes a bottom surface part 82a and four column parts 82b extending from four corners of the bottom surface part 82a in a vertical direction. Concave parts 82c are formed inside respective column parts 82b so that four corners of the cover glasses 80 are housed.

The holder 82 is formed so that spaces between respective column parts 82b and an upper surface thereof open, thereby housing and taking the cover glasses 80 in and out from the holder 82 easily. The holder 82 may have a structure in which four directions and the bottom surface are surrounded by walls and only the upper surface opens.

A cover slip information 84 is written on the surface in any position of the holder 82. In FIG. 8, the information is written on any side surface of the column part 82b.

As a writing method, the bar code, the QR code or the like can be adopted.

The cover slip information 84 includes at least a type of the cover glass. It is preferable that the cover slip information also includes the expiration date and so on.

Figure 9:
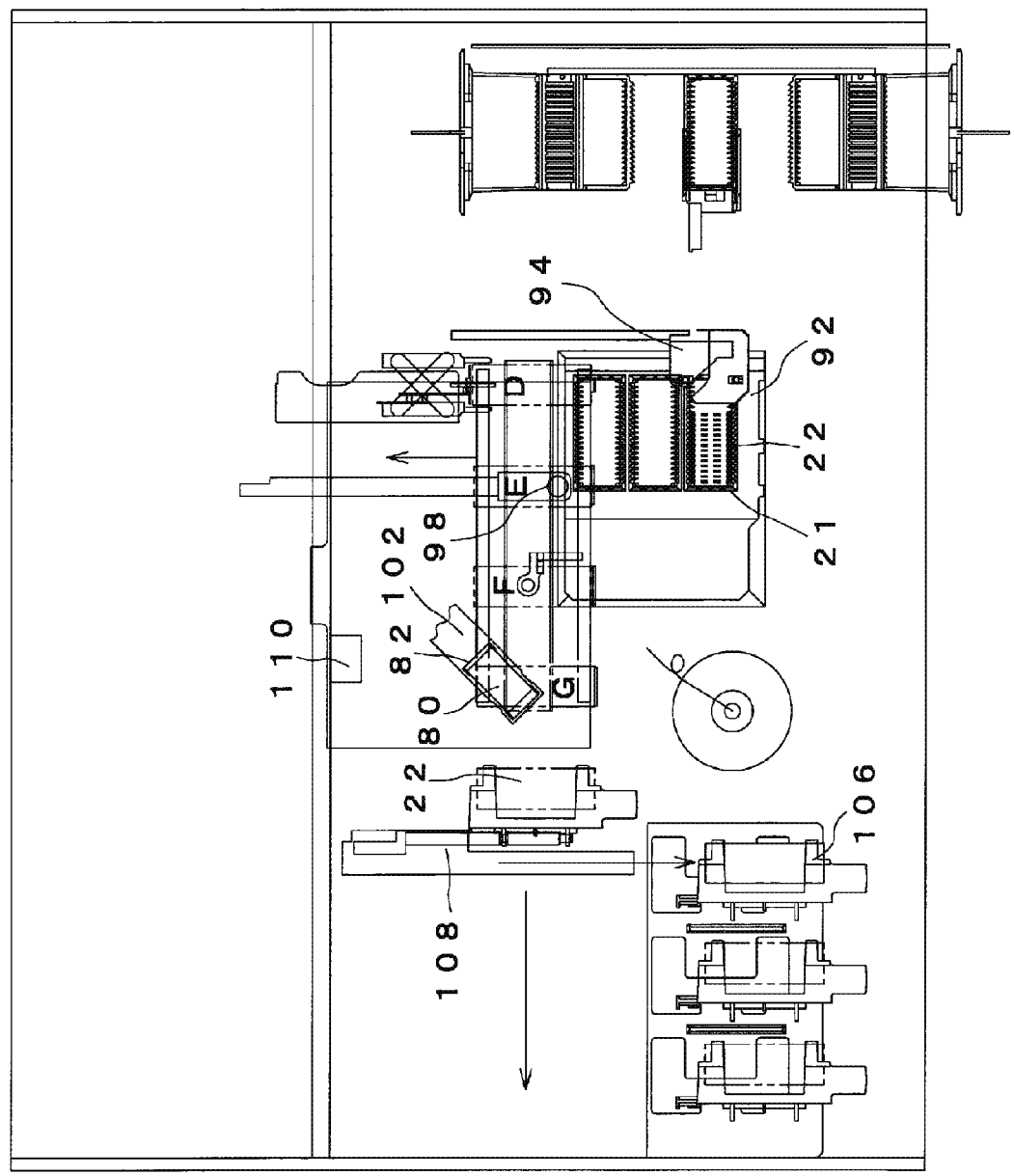
FIG. 9 is an explanatory view showing an internal structure of a cover glass sticking device seen from above.

Next, a structure of the cover glass sticking device will be explained with reference to FIG. 9 and FIG. 10.

The cover glass sticking device 90 is provided with a dipping bath 92 in which the clearing agent is contained. A plurality of slide glasses 22 to which sliced specimens are attached are housed in the basket 21. The basket 21 has a shape in which the plural slide glasses 22 to which sliced specimens are attached are inserted and housed so as to be perpendicular to the bottom surface part. The slide glasses 22 are housed inside the dipping bath 92 in a state of being housed in the basket 21 to be dipped in the clearing agent.

A take-out mechanism unit 94 for pulling up the slide glasses from the basket 21 is arranged at an upper part of the dipping bath 92. The take-out mechanism unit 94 moves upward while holding an upper edge of the slide glass 22 and rotates the slide glass 22 horizontally after moving upward in a predetermined height to arrange the slide glass 22 in a first station D.

The first station D is provided at a start position in a traveling direction of the slide glass 22 in a conveying device 96. The conveying device 96 conveys the slide glass 22 in an order of the first station D, a second station E, a third station F and a fourth station G.

In the second station E, a dispensing nozzle 98 for dispensing a sealing agent to the slide glass 22 or a solvent for dissolving the sealing agent previously applied to the cover glass is provided. A tip end of the dispensing nozzle 98 is inserted into a container 100 that contains a solvent preventing solidification of the sealing agent.

The third station F is a place where the cover glass 80 is stuck on the slide glass 22.

A mounting part 102 on which the holder 82 housing the cover glasses 80 are mounted is provided above the second station F. A suction pad 104 that sucks and holds the cover glass 80 is provided above the third station F at a higher position than the mounting part 102.

In the third station F, the suction pad 104 sucks and holds a piece of cover glass 80 and moves downward to stick the cover glass 80 on the slide glass 22 placed on the third station F. In the embodiment, the suction pad 104 corresponds to a sticking part in claims.

The fourth station G is a station where the slide glass 22 on which the cover glass 80 is stuck is placed for housing the slide glass 80 in a housing part 106.

On a downstream side in a conveying direction of the fourth station G, a housing mechanism unit 108 that holds the slide glass and houses the slide glass in the housing part 106 is provided.

The housing mechanism unit 108 holds the slide glass 22 placed on the fourth station G and moves the slide glass 22 to the downstream side in the conveying direction. Then, the housing mechanism unit 108 moves the held slide glass 22 downward to house the slide glass 22 on which the cover glass 80 is stuck in the housing part 106 positioned below the housing mechanism unit 108.

Figure 10:
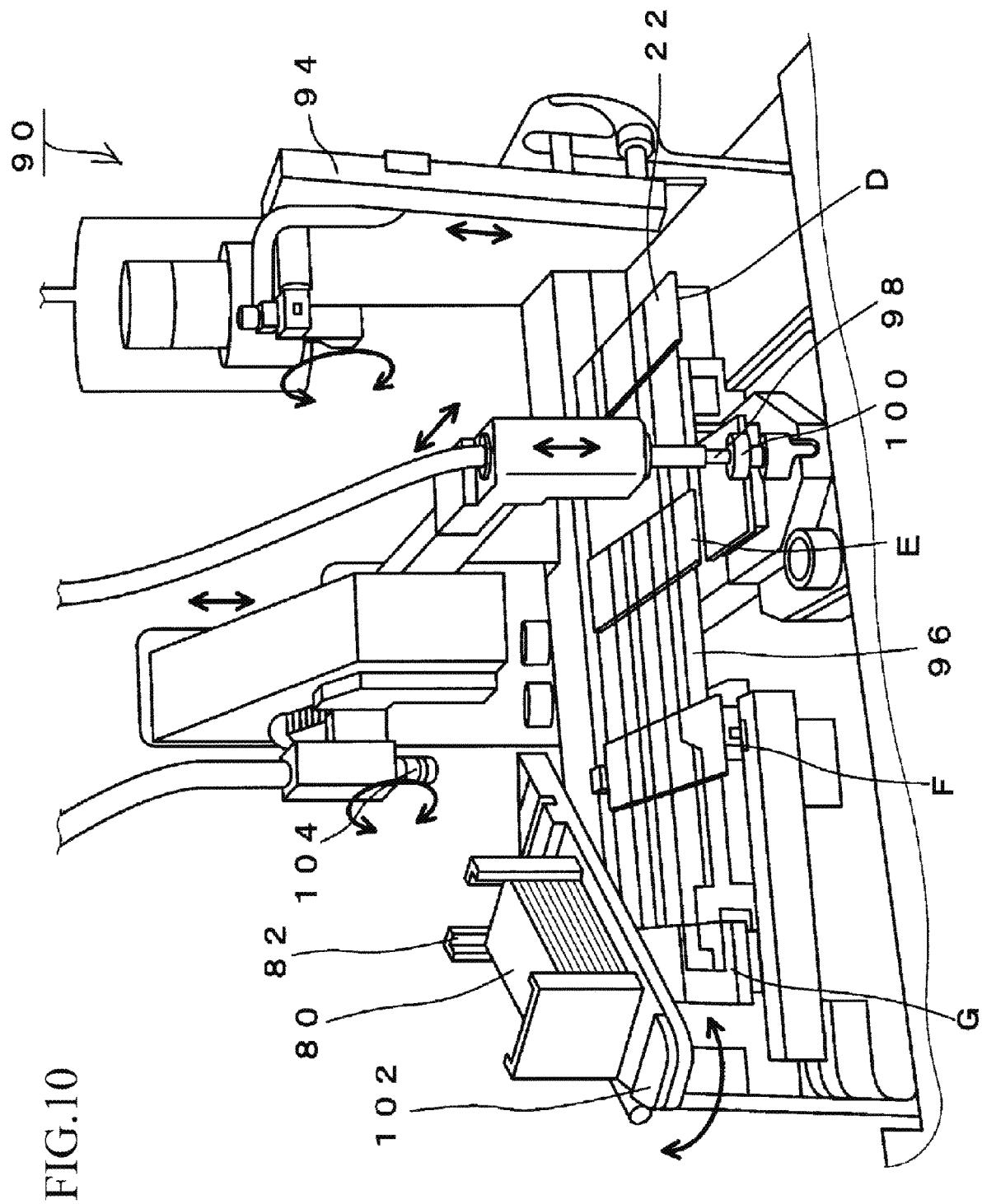
FIG. 10 is an explanatory view showing the internal structure of the cover glass sticking device.

A reading unit 110 that reads the cover slip information written on the surface of the holder 82 is provided in the vicinity of the third station F or the fourth station G (not shown in FIG. 10).

Figure 11:
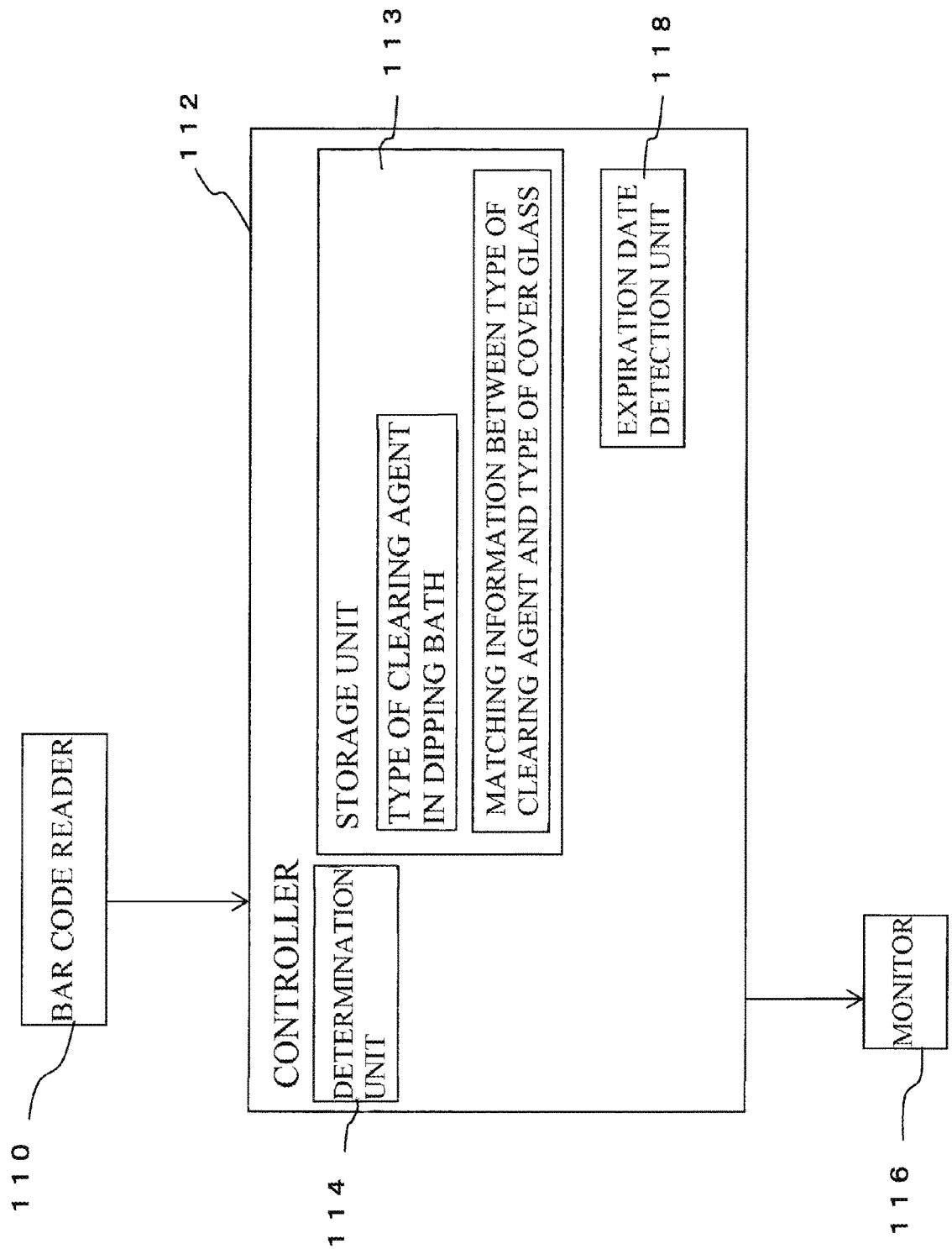
FIG. 11 is a block diagram showing an embodiment in which cover slip information corresponds to a bar code and a notification unit corresponds to a monitor.

Subsequently, the cover slip information and usage thereof will be explained with reference to FIG. 11.

Figure 8:
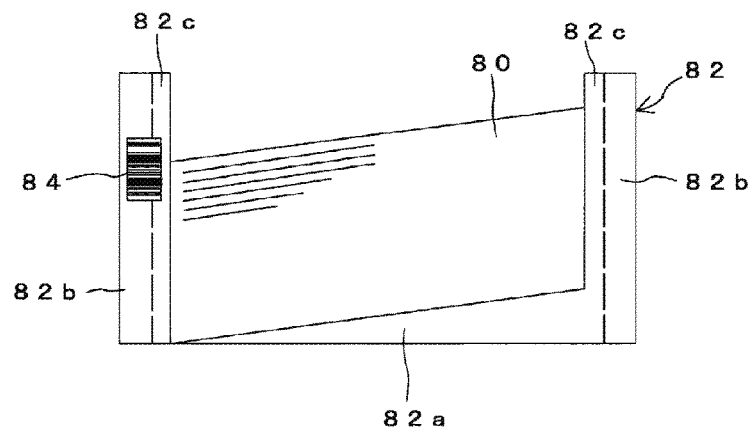
FIG. 8 is a front view showing an external structure of a holder for cover glasses.

As the case where the cover slip information is written by the bar code as shown in FIG. 8 has been explained in the present embodiment, an example where the bar code reader is used as the reading unit 110 will be explained.

The reading unit 110 may adopt a CCD camera or the like instead of the bar code reader. The QR code can be used as the cover slip information. In that case, the CCD camera is used as the reading unit 110 and read data is analyzed by an application for identifying the QR code.

The operation of reading the cover slip information by the bar code reader 110 is executed based on an instruction from a controller 112.

The controller 112 controls the entire operation of the cover glass sticking device 90, including a CPU, a memory and so on. An operation control program is stored in the memory in advance, and the operation of the cover glass sticking device 90 is executed by executing the operation control program.

The operation of the cover glass sticking device 90 includes the operation of the take-out mechanism unit 94 that takes out the slide glass 22 from the dipping bath 92 and places the slide glass 22 on the first station D, the intermittent conveying operation by the conveying device 96, the dispensing operation by the dispensing nozzle 98, the taking-out and sticking operations of the cover glass 80 on the slide glass 22 by the suction pad 104, the housing operation of the slide glass 22 in the housing part 106 by the housing mechanism unit 108 and so on.

The controller 112 is provided with a storage unit 113 storing a type of the clearing agent currently contained in the dipping bath and matching information between the types of the clearing agent and types of the cover glasses.

It is necessary that an operator store the information in the storage unit 113.

The types of the cover glasses include whether sealing agents are previously applied to respective cover glasses or not and types of the sealing agents when the sealing agents are applied.

Moreover, the matching information stored in the storage unit 113 is information concerning whether the types of the clearing agents to be contained in the dipping bath 92 match with plural types of sealing agents or not, respectively.

The controller 112 extracts information concerning whether the sealing agent is previously applied to the cover glass or not and the type of the sealing agent if it is applied from the cover slip information read out by the bar code reader 110, and a determination unit 114 as a function of the controller 112 determines that the sealing agent is not applied to the cover glass, determines that the sealing agent applied to the cover glass matches with the clearing agent currently contained in the dipping bath or determines that the sealing agent applied to the cover glass does not match with the clearing agent currently contained in the dipping bath.

When it is determined that the sealing agent is not applied to the cover glass and when it is determined that the sealing agent applied to the cover glass matches with the clearing agent currently contained in the dipping bath by the determination unit 114, the controller 112 does not particularly take an action. However, when it is determined that the sealing agent applied to the cover glass does not match with the clearing agent currently contained in the dipping bath, the controller 112 notifies the operator of the status through a notification unit.

A monitor 116 such as liquid crystal can be adopted as the notification unit. The controller 112 allows the monitor 116 to display that "the sealing agent applied to the cover glass does not match with the clearing agent" to prompt the operator to replace the cover glass.

The controller 112 may display the status on the monitor 116 also when the sealing agent is not applied to the cover glass and when the sealing agent applied to the cover glass matches with the clearing agent currently contained in the dipping bath.

The cover slip information may also include an expiration date of the cover glass.

In this case, the calendar function is provided in advance in the controller 112 (not shown). When the expiration date is included in the cover slip information read out by the bar code reader 110, an expiration date detection unit 118 as a function of the controller 112 compares a current date with the expiration date. When the expiration date detection unit 118 detects that the cover glass is within the expiration date for use, the controller 112 does not particularly take an action, and when the expiration date detection unit 118 detects that the expiration date has passed, the controller 112 allows the monitor 116 to display the status to prompt the operator to replace the cover glass.

The cover slip information may further includes a lot number. The expiration date is not necessary in this case. Also in this case, it is necessary to previously provide the calendar function and data in which lot numbers are associated with expiration dates in the controller 112 (not shown).

The expiration date detection unit 118 of the controller 112 calculates the expiration date from the data stored in advance based on the lot number read out by the bar code reader 110 and compares the current date with the expiration date. When expiration date detection unit 118 detects that the cover glass is within the expiration date for use, the controller 112 does not particularly take an action, and when the expiration date detection unit 118 detects that the expiration date has passed, the controller 112 allows the monitor 68 to display the status to prompt the operator to replace the cover glass.

The cover slip information may include a manufacturing date of the cover glass. The expiration date is not necessary in this case. Also in this case, it is necessary to previously provide the calendar function and data in which manufacturing dates are associated with expiration dates in the controller 112 (not shown).

The expiration date detection unit 118 of the controller 112 calculates the expiration date from the data stored in advance based on the manufacturing date read out by the bar code reader 110 and compares the current date with the expiration date. When expiration date detection unit 118 detects that the cover glass is within the expiration date for use, the controller 112 does not particularly take an action, and when the expiration date detection unit 118 detects that the expiration has passed, the controller 112 allows the monitor 116 to display the status to prompt the operator to replace the cover glass.

The monitor 116 is not used only for notifying the matching between the sealing agent of the cover glass and the clearing agent and/or for notifying the expiration date but also may be used also as a monitor for displaying normal sticking work.

Figure 12:
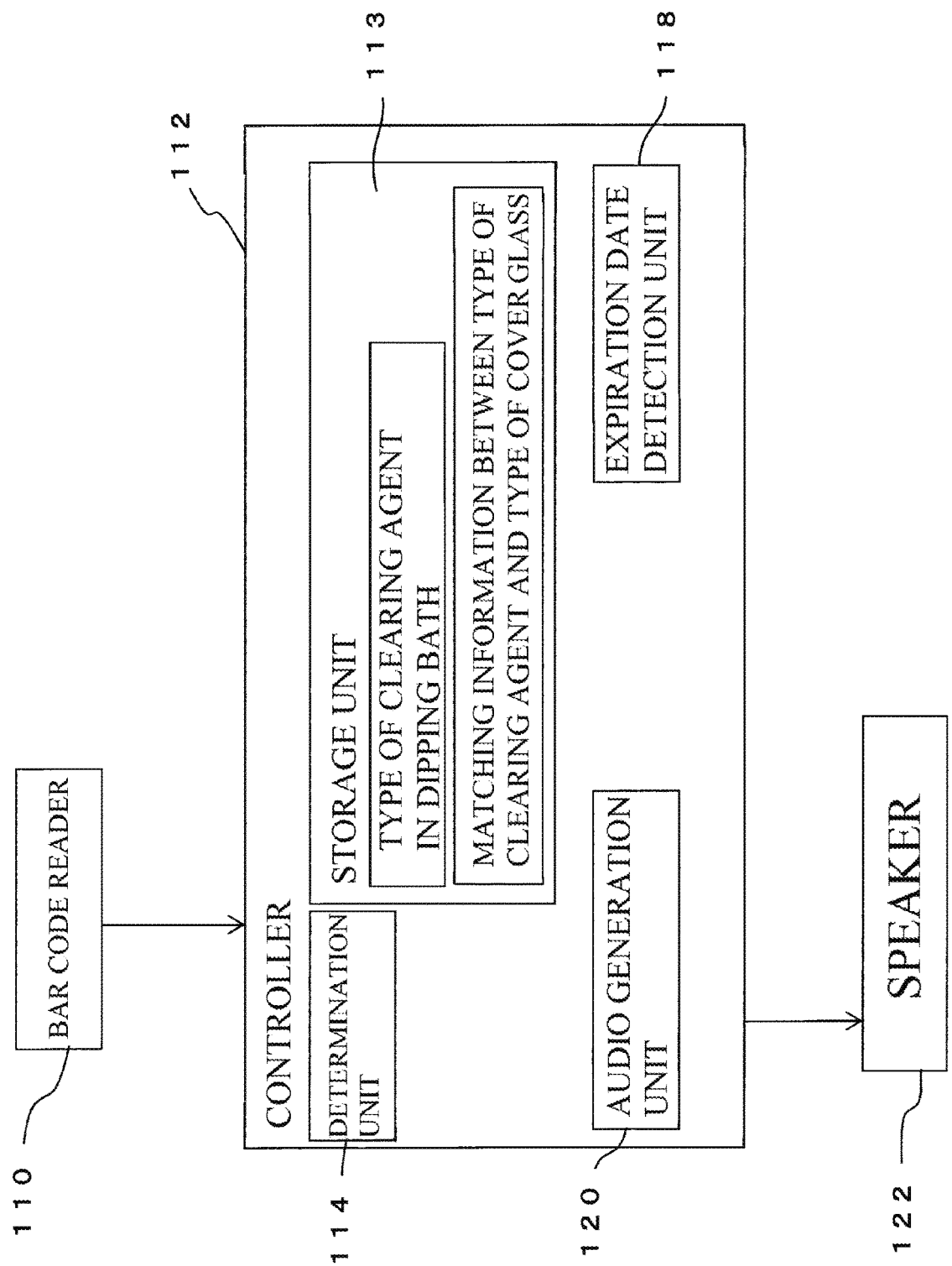
FIG. 12 is a block diagram showing the embodiment in which the cover slip information corresponds to the bar code and the notification unit corresponds to a speaker.

The notification unit is not limited to the monitor but may be configured by an audio generation unit 120 and a speaker 122 for outputting the contents indicating that "the sealing agent applied to the cover glass does not match with the clearing agent", "the expiration date has passed" and so on by audio as shown in FIG. 12.

In the case of the configuration, it is necessary that the audio generation unit 120 stores audio data such as "the sealing agent applied to the cover glass does not match with the clearing agent" and "the expiration date has passed" in advance.

Furthermore, the notification unit may notify the operator by using buzzer sound other than audio from the speaker 122 in the case where the sealing agent does not match with the clearing agent and/or the expiration data has passed.

Figure 13:
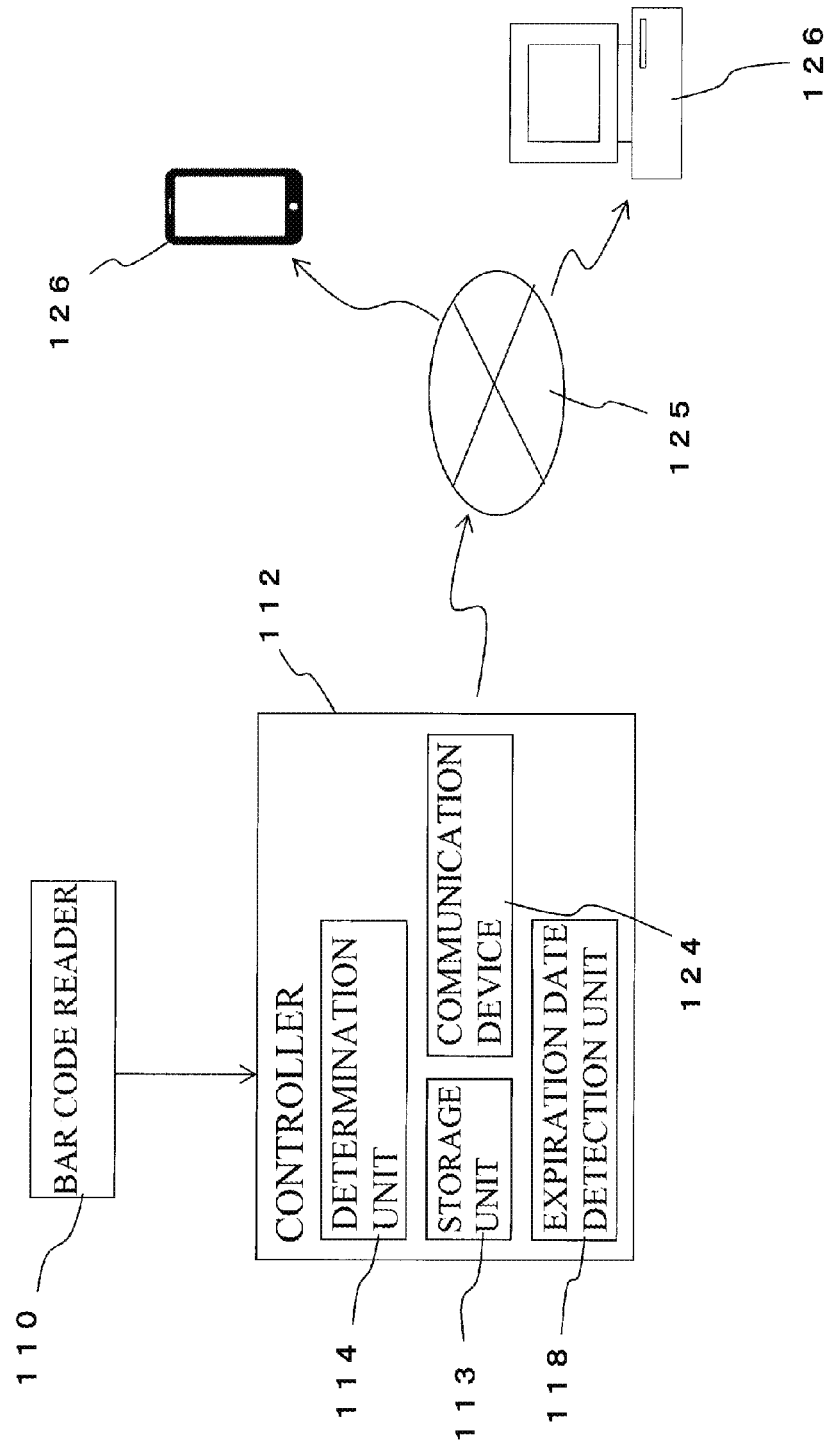
FIG. 13 is a block diagram showing the embodiment in which the cover slip information corresponds to the bar code and the notification unit corresponds to an external apparatus connected by a communication device.

As shown in FIG. 13, the notifying unit may also be a communication device 124 capable of performing data communication with an external apparatus. The communication device 124 is connected to a communication line 125 such as Internet so as to perform data communication and can notify an external apparatus 126 connected to the communication line 125. As the external apparatus 126, portable communication devices such as a smart phone or a normal personal computer can be cited.

For example, in the case where the sealing agent does not match with the clearing agent and/or that the expiration date has passed, the communication device 124 transmits the status that the sealing agent does not match with the clearing agent and/or that the expiration date has passed to the external apparatus 126. Accordingly, the above information can be notified to a person possessing the external apparatus 126.

It is preferable that the controller 112 allows the storage unit 113 to store results about whether the sealing agent matches with the clearing agent as a determination result by the determination unit 114 and/or whether the expiration date has passed or not as a determination result by the expiration date determination unit 118.

As these results are stored in the storage unit 113, it is possible to ensure traceability and to pursue a cause easily when any problem is found after sticking.

Respective examples in which the monitor 116, the speaker 122 and the external apparatus 126 are adopted as the notification unit have been explained in the above third embodiment, and configurations in which these components are combined suitably may be adopted in the present invention.

Fourth Embodiment

In a fourth embodiment, an example in which cover slip information is stored in a cover slip storage unit capable of rewriting data will be explained. The same symbols are given to the same components as those of the third embodiment and explanation thereof may be omitted.

Figure 14:
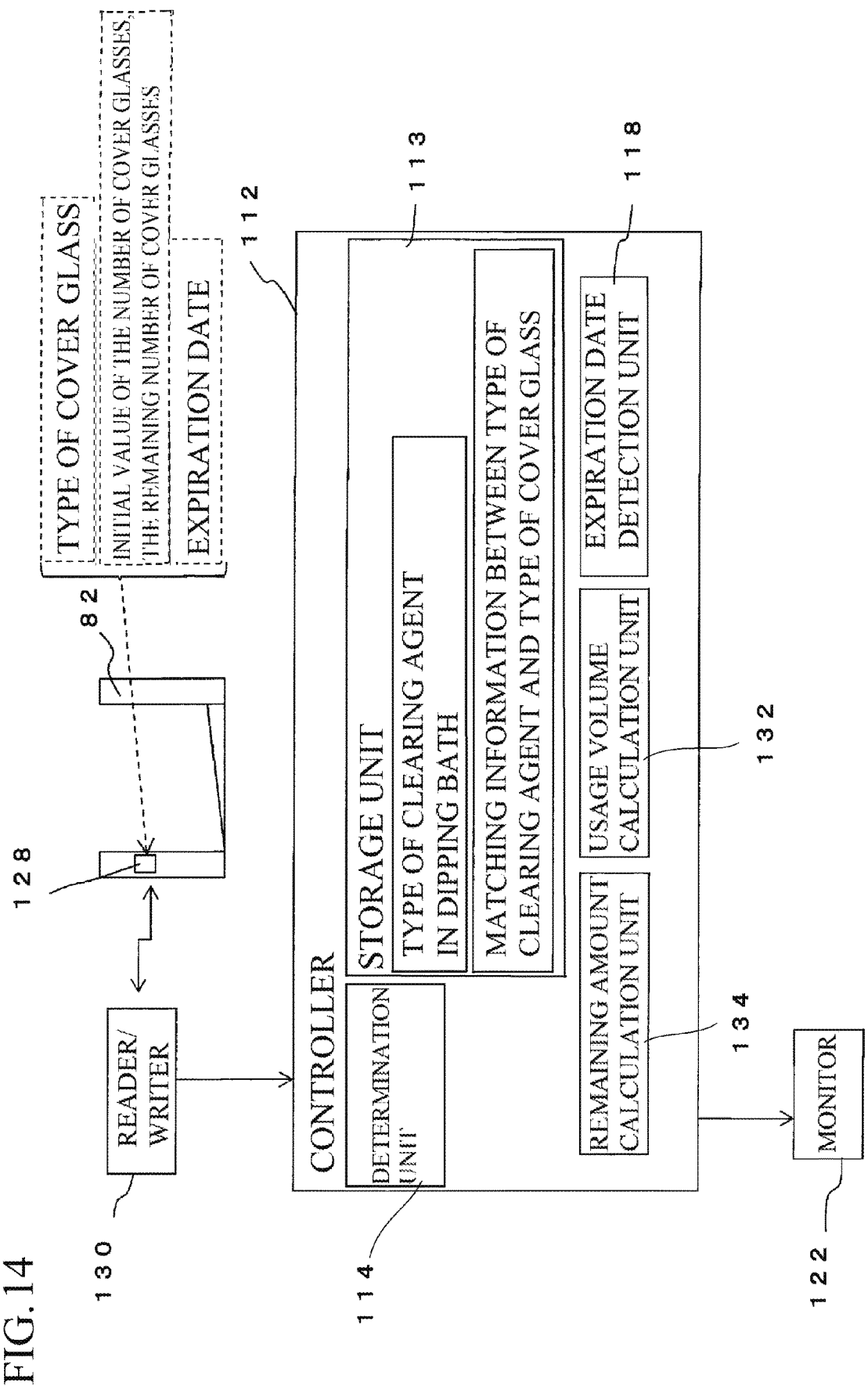
FIG. 14 is a block diagram showing an embodiment in a case where cover slip information is stored in an RFID.

Hereinafter, an embodiment in which RFID 128 is adopted as the cover slip storage unit will be explained with reference to FIG. 14.

The RFID 128 is embedded in any position of the holder 82.

The cover glass sticking device 90 is also provided with a reader/writer 130 capable of reading and writing data from and in the RFID 128.

As the cover slip information stored in the RFID 128, an initial value of the number of cover glasses is stored in a case of brand-new cover glasses and the remaining number of the cover glasses is stored in a case of used cover glasses, in addition to the type and the expiration date of the cover slip. It is also preferable that the lot number or the manufacturing date of the cover glasses is stored, not the expiration date, as the cover slip information in the same manner as the third embodiment.

The cover glass sticking device 90 is provided with a usage volume calculation unit 132 calculating a usage volume (the number) of the cover glasses. The usage volume calculation unit 132 is provided as a function of the controller 112. The usage volume calculation unit 132 can calculate the number of used cover glasses by counting the number of times of taking out the cover glasses from the holder 82 by using the suction pad 104.

The cover glass sticking device 90 is also provided with a remaining amount calculation unit 134 for calculating the remaining number of cover glasses inside the holder 82 based on the used number of cover glasses.

The remaining amount calculation unit 134 is provided as a function of the controller 112. The remaining amount calculation unit 134 can perform calculation by subtracting the used number of cover glasses calculated by the usage volume calculation unit 132 from the initial value of the number of cover glasses.

The reader/writer 130 can write the remaining number of cover glasses in the RFID 128 based on the remaining number of cover glasses calculated by the remaining amount calculation unit 134.

As the initial value of the number of cover glasses is stored in the RFID 128 if an unused holder 82 is used for the first time, the reader/writer 130 rewrites the initial value or stores the remaining number separately from the initial value.

In a case of using the holder 82 used last time, the remaining number is stored in the RFID 128, therefore, the reader/writer 130 rewrites the remaining number.

The usage volume calculation unit 132 and the remaining amount calculation unit 75 preferably execute calculation of the remaining amount of the cover film when one-day operation is finished by the operator, namely, when an operation of turning off a power switch of the cover film sticking device 30 is performed as a trigger.

The holder 82 housing the cover glasses 80 is removed from the cover glass sticking device 90 after one-day operation of the cover glass sticking device is finished, and is newly placed on the mounting part 102 and used at the next time for the purpose of preventing drying of the sealing agent applied to the cover glasses 80.

As the remaining number of cover glasses is stored in the RFID 128 at this time, the controller 112 reads the remaining amount of cover glasses from the RFID 128 and displays the remaining amount on the monitor 116, thereby allowing the operator to know the timing when the cover glasses 80 (holder 82) should be replaced after use.

The controller 112 may collect use history of the cover glass sticking device 90 and may store the collected use history in the RFID 128 of the holder 82 from the reader/writer 130.

According to the above, even when it is difficult to read out use history due to failure or the like of the cover glass sticking device 90 itself, the use history can be read out from the holder 82.

The example in which the monitor 116 is adopted as the notification unit has been explained in the above fourth embodiment, however, the speaker 122 or the external apparatus 126 may be adopted as the notification unit and configurations in which these components are combined suitably may also be adopted.

The reader/writer 130 may be provided in the outside of the cover glass sticking device 90 separately, not in the inside of the cover glass sticking device 90 (not shown). In this case, the cover slip information can be read and written from the outside of the cover glass sticking device 90.

What is claimed is:

1. A cover slip sticking device comprising:
    a dipping bath in which a clearing agent is contained and slide glasses on which specimens are attached are housed to be dipped in the clearing agent;
    a holder holding a cover slip as a cover film or a cover glass, wherein cover slip information is printed on a surface of the holder or stored in a cover slip storage unit provided to the holder, wherein the cover slip information comprises at least:
       1) a type of the cover slip held therein;
       2) whether a sealing agent is applied to the cover slip; and
       3) if a sealing agent is applied to the cover slip, a type of the sealing agent;
    a mounting part on which the holder is mounted;
    a sticking part operable to stick the cover slip taken out from the holder mounted on the mounting part on the slide glass;
    a reading unit operable to read the cover slip information;
    a memory storage unit operable to store clearing agent information, the clearing agent information comprising:
       1) a type of the clearing agent currently contained in the dipping bath; and
       2) information matching types of clearing agents and types of sealing agents applied to cover slips; and
    a controller programmed to:
    (A) determine, based on the cover slip information read by the reading unit and the clearing agent information stored in the memory storage unit;
       1) whether a sealing agent is applied to the cover slip and, if it is determined that a sealing agent is applied, the type of the sealing agent; and
       2) the type of the clearing agent currently contained in the dipping bath, and
    wherein the controller is programmed to:
    (B) take no action when it is determined that a sealing agent is not applied to the cover slip or when it is determined that a sealing agent applied to the cover slip matches with a clearing agent currently contained in the dipping bath, and
    (C) notify through a notification unit when it is determined that a sealing agent applied to the cover slip does not match with a clearing agent currently contained in the dipping bath.

2. The cover slip sticking device according to claim 1, wherein the cover slip information contains an expiration date of the cover slip, further comprising:
a calendar function; and
an expiration date detection unit operable to compare the expiration date in cover slip information read by the reading unit with a current date based on the calendar function to detect that the expiration date has passed since the current date.

3. The cover slip sticking device according to claim 2, further comprising:
a notification unit operable to notify an operator of a result determined by the determination unit;
wherein the expiration date detection unit notifies that the expiration date has passed by the notification unit when detecting that the expiration date has passed.

\* \* \* \* \*